United States Patent [19]

Markusch et al.

[11] 4,146,509

[45] Mar. 27, 1979

[54] PROCESS FOR THE PRODUCTION OF INORGANIC-ORGANIC PLASTICS

[75] Inventors: Peter Markusch, Cologne; Dieter Dieterich, Leverkusen; Norbert Künstler, Leichlingen, all of Fed. Rep. of Germany

[73] Assignee: Bayer Aktiengesellschaft, Leverkusen, Fed. Rep. of Germany

[21] Appl. No.: 753,770

[22] Filed: Dec. 23, 1976

[30] Foreign Application Priority Data

Dec. 31, 1975 [DE] Fed. Rep. of Germany ....... 2559255

[51] Int. Cl.$^2$ .............................................. C08J 9/00
[52] U.S. Cl. .................. 521/115; 260/37 N; 521/121; 521/122; 521/154; 521/107; 521/162; 521/100
[58] Field of Search .................. 260/2.5 AC, 2.5 AK, 260/77.5 AC, 37 N, 29.2 TN

[56] References Cited

U.S. PATENT DOCUMENTS

| 2,950,262 | 8/1960 | Bush et al. ..................... 260/2.5 AC |
| 3,372,130 | 3/1968 | Chess et al. ................... 260/2.5 AC |
| 3,471,423 | 8/1969 | Elmer et al. ................... 260/2.5 AC |
| 3,767,602 | 10/1973 | Carroll et al. ................. 260/2.5 AC |
| 3,769,244 | 10/1973 | Hashimoto et al. ........... 260/2.5 AC |
| 3,981,831 | 9/1976 | Markusch et al. ............ 260/2.5 AK |
| 3,983,081 | 9/1976 | Dieterich et al. ............. 260/2.5 AK |

*Primary Examiner*—Lewis T. Jacobs
*Attorney, Agent, or Firm*—Gene Harsh; Joseph C. Gil

[57] ABSTRACT

The instant invention is directed to a process for the production of inorganic-organic resins, by reaction of an organic polyisocyanate with aqueous basic solutions having an inorganic solid content of from 20 to 80% by weight in the presence of catalysts and optionally other additives, characterized in that the organic polyisocyanate and the aqueous basic solution are used in a proportion by weight of between 80:20 and 10:90 parts by weight and that organic ammonium compounds are used as catalysts.

19 Claims, No Drawings

PROCESS FOR THE PRODUCTION OF INORGANIC-ORGANIC PLASTICS

BACKGROUND OF THE INVENTION

Inorganic-organic resins based on polyisocyanates and aqueous alkali metal silicate solutions are already known and have been described, for example, in German Offenlegungsschriften Nos. 1,770,384; 2,227,147; 2,359,606; 2,359,607; 2,359,608; 2,359,609; 2,359,610; 2,359,611 and 2,359,612; and, German Auslegeschrift No. 2,310,559.

One of the main advantages which these materials have over purely organic materials is their improved fire resistance due to their inorganic constituents. Depending on their composition and the reaction conditions employed, they may be foamed or noncellular products, hard or soft, brittle or flexible. Due to the wide range of variation of the properties of these inorganic-organic materials, they have a wide range of possible applications.

Although the reaction speed obtained when mixing polyisocyanates and alkali metal silicates can be directly influenced by the alkalinity of the aqueous/alkali metal silicate solution, the nature of the selected polyisocyanate, the temperature, the intensity and duration of the mixing process, and the like, it is often desirable to use catalysts as well, particularly for producing inorganic-organic foams.

It has previously been known for this purpose to use catalysts such as tertiary amines; silaamines; tetraalkyl ammonium hydroxide, alkali metal hydroxides; alkali metal phenolates; alkali metal alcoholates; hexahydrotriazines and organic metal compounds, particularly organic tin compounds, which are normally used for the production of polyurethane foams. Tertiary amines were preferably used, and these could in addition contain hydrogen atoms which were reactive with isocyanate groups. In the examples given in German Offenlegungsschrift No. 1,770,384, for example, one of the catalysts used was an amine catalyst (mixture of 3 parts of N-β-hydroxyethyldimethylamine and 1 part of triethylene diamine)

One disadvantage of such catalysts, however, is that when mixed with isocyanates they are not stable in storage because they frequently promote the reaction of isocyanate groups with each other even at room temperature, thus giving rise to an undesirable increase in the viscosity of the mixture during storage. Moreover, the amines used are generally insoluble in concentrated aqueous alkali metal silicate solutions because of the basic nature of aqueous alkali metal silicates. The amines either separate when left to stand for a short time or may even decompose.

These difficulties in the production of inorganic-organic plastics has been generally overcome by emulsifying the catalysts in the aqueous alkali metal silicate component, by dissolving them in the polyisocyanate shortly before the alkali metal silicate component is mixed with the polyisocyanate, or by adding the catalysts through a separate feed device.

All these methods, however, are unsatisfactory from a commercial and economical point of view. The separate addition of catalyst is often quantitatively inaccurate due to the very small proportion of catalyst used relative to the other reactant. Moreover, the catalyst must in some cases be used as a third component so that commercial two-component feeding devices cannot be used. If the catalysts, on the other hand, are first mixed with the aqueous alkali metal silicate solutions, the time taken for mixing must not be more than a few minutes because otherwise phase separation may take place, for example between the organic amine and the aqueous basic phase. Even the use of hydrophilic amines such as triethanolamine does not obviate this difficulty.

Another disadvantage of using tertiary amines is that most of them have an unpleasant smell. The organometallic catalysts frequently used in polyurethane chemistry, such as tin(II) octoate or dibutyl tin dilaurate, are also hardly suitable for the commercial production of inorganic-organic resins because they are either insoluble in the aqueous alkali metal silicate solutions or decomposed by them. Hexahydrotriazines, tetraalkylammonium hydroxide and silaamines also show signs of incompatibility, i.e., insolubility or decomposition in concentrated alkaline aqueous silicate solutions.

When alkali metal hydroxides, alkali metal phenolates and alkali metal alcoholates are used as catalysts, the inorganic-organic products obtained are frequently unsatisfactory in their use properties, and, in particular, are often sandy or brittle with little mechanical strength.

It is, therefore, an object of the present invention to substantially overcome the disadvantages attending the use of the known catalysts and to discover catalysts which have the advantage of being soluble and stable in storage in the polyisocyanate and which give rise to high quality inorganic-organic resins, and, particularly foams, when mixed with aqueous basic solutions.

DESCRIPTION OF THE INVENTION

The instant invention is directed to a process for the production of inorganic-organic resins, in particular foams, by reaction of an organic polyisocyanate with aqueous basic solutions having an inorganic solids content of from 20 to 80% by weight, and preferably 30 to 70% by weight, in the presence of catalysts and, optionally, other additives, characterized in that the organic polyisocyanate and aqueous basic solution are used in proportions by weight of between 80:20 and 10:90, and preferably between 60:40 and 20:80, and in that the catalysts used are organic ammonium compounds. By the term "organic ammonium compounds" is meant organic secondary amine salts, organic tertiary amine salts and organic quaternary ammonium salts.

The preferred organic ammonium compounds according to the invention are salts of the general formula

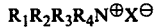

in which
$R_1$, $R_2$, $R_3$ represent alkyl, aryl, cycloalkyl or $R_1 + R_2$ may together represent alkylene, arylene or cyclo alkylene and
$R_4$ represents H, $R_1$, $R_2$ or $R_3$ and
$X^\ominus$ is an anion.
$X^\ominus$ preferably represents one of the following anions:
$RCOO^\ominus$; $H_2PO_4^\ominus$; $H_2PO_3^\ominus$; $ROSO_3^\ominus$; $RSO_3^\ominus$; $ArO^\ominus$; $(RO)_2PO_2^\ominus$;
$(RO)_2PO^\ominus$; $H(RO)PO_3^\ominus$; $F^\ominus$; $Cl^\ominus$; $Br^\ominus$; $I^\ominus$; $NO_3^\ominus$; $HSO_4^\ominus$;
$HSO_3^\ominus$; $CN^\ominus$; $SCN^\ominus$; or $HCO_3^\ominus$
in which
R represents $R_4$
$R_1$, $R_2$ and $R_3$ can be the same or different and can represent $C_1-C_{12}$ alkyl groups, $C_6-C_{14}$ aryl groups or $C_4$—$C_{14}$ cycloalkyl groups which may be substituted, for example by halogen, hydroxyl, nitro or alkoxy groups.

Also included among the preferred organic ammonium compounds are salts of the following formula

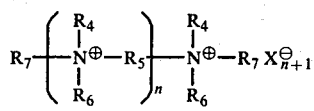

in which $R_4$ and $X^\ominus$ have the meanings specified above, n represents 1 or 2, $R_5$ represents an alkylene group having from 2 to 4 carbon atoms, $R_6$ and $R_7$ may be the same or different and represent alkyl groups having from 1 to 4 carbon atoms or, if $n=1$ then 2 groups $R_6$ and/or $R_7$ may together represent a $C_1$ to $C_3$, preferably a $C_2$ alkylene group joining the two nitrogen atoms together.

As aqueous basic solutions with an inorganic solid content of 20 to 80% by weight, preferaly 30 to 70% by weight, aqueous alkali metal silicate solutions, alkali stabilized silica sols and aqueous suspensions of inorganic fillers are mainly used.

According to the invention, it is preferred to employ a procedure in which the catalyst is dissolved in the polyisocyanate. It is particularly preferred to prepare the dissolved catalyst in the polyisocyanate component by first dissolving the appropriate acid in the polyisocyanate and then adding a tertiary amine to neutralize the acid. The catalyst may also be used in aqueous solution.

In the most preferred procedure according to the invention, the acid component for preparing the catalyst is used in molar excess over the tertiary amine.

The present invention also relates to inorganic-organic resins and particularly to foam resins which can be obtained by the above mentioned processes.

The inorganic-organic foams according to the invention can have widely varied properties but preferably have bulk densities below 200 kg/m$^3$, and most preferably below 100 kg/m$^3$; especially 8–80 kg/m$^3$.

The polyisocyanates used as starting components according to the invention may be aliphatic, cycloaliphatic, araliphatic, aromatic or heterocyclic polyisocyanates such as those described, e.g., by W. Siefken in Justus Liebigs Annalen der Chemie, 562, pages 75 to 136. Examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl cyclohexane as described in German Ausslegeschrift No. 1,202,785 and U.S. Pat. No. 3,401,190; hexahydrotolyene-2,4- and -2,6-diisocyanate and mixtures of these isomers; hexahydrophenylene-1,3- and/or 1,4-diisocyanate; perhydrodiphenylmethane-2,4'- and/or 4,4'-diisocyanate; phenylene-1,3- and -1,4-diisocyanate; tolylene-2,4- and -2,6-diisocyanate and mixtures of these isomers; diphenylmethane-2,4'- and/or 4,4'-diisocyanate; naphthylene-1,5-diisocyanate; triphenylmethane-4,4', 4''-triisocyanate; polyphenyl-polymethylene polyisocyanates which can be obtained by aniline formaldehyde condensation followed by phosgenation and which have been described, e.g., in British Pat. No. 874,430 and No. 848,671; m- and p-isocyanatophenylsulphonyl isocyanates as described in U.S. Pat. No. 3,454,606; perchlorinated arylpolyisocyanate as described in U.S. Pat. No. 3,277,138; polyisocyanates with carbodiimide groups as described in U.S. Pat. No. 3,152,162; diisocyanates of the kind described in U.S. Pat. No. 3,492,330; polyisocyanates with allophanate groups as described in British Pat. No. 994,890, Belgian Pat. No. 761,626, and published Dutch patent application No. 7,102,524; polyisocyanates with isocyanurate groups as described in U.S. Pat. No. 3,001,973, German Pat. Nos. 1,022,789, 1,222,067 and 1,027,394, and German Offenlegungsschrift No. 1,929,034 and No. 2,004,048; polyisocyanates with urethane groups as described in Belgian Pat. No. 752,261 and U.S. Pat. No. 3,394,164; polyisocyanates with acylated urea groups as described in German Pat. No. 1,230,778; polyisocyanates with biuret groups as described in U.S. Pat. No. 3,124,605 and No. 3,201,372 and British Pat. No. 889,050; polyisocyanates prepared by telomerization reactions as described in U.S. Pat. No. 3,654,106; polyisocyanates with ester groups as described in British Pat. No. 965,474 and No. 1,072,956, U.S. Pat. No. 3,567,763 and German Pat. No. 1,231,688; reaction products of the above mentioned isocyanates with acetals as described in German Pat. No. 1,072,385; and, polyisocyanates containing polymeric fatty acid groups as described in U.S. Pat. No. 3,455,883.

The distillation residues containing isocyanate groups from the commercial production of isocyanates may also be used, optionally dissolved in one or more of the above mentioned polyisocyanates. Any mixtures of the above mentioned polyisocyanates may also be used.

It is generally particularly preferred to use readily available polyisocyanates such as tolylene-2,4- and -2,6-diisocyanate and mixtures of these isomers ("TDI"); polyphenylpolymethylene polyisocyanates which can be obtained by aniline formaldehyde condensation followed by phosgenation ("crude MDI"); and polyisocyanates containing carbodiimides, urethane, allophanate, isocyanurate, urea or biuret groups ("modified polyisocyanates").

According to the invention, it is particularly preferred to use polyisocyanates which have ionic groups as described in German Offenlegungsschrift No. 2,227,147. Specific examples include sulphonated polyisocyanates as described in German Offenlegungsschriften No. 2,227,111, No. 2,359,614 and No. 2,359,615 and polyisocyanates containing carboxyl or carboxylate groups as described in German Offenlegungsschrift No. 2,359,613. Also preferred according to the invention are the non-ionic hydrophilic polyisocyanates of the kind described in German Offenlegungsschrift No. 2,325,909; polyisocyanates with polar groups as described in German Offenlegungsschrift No. 2,359,606; and polyisocyanates with phenolic hydroxyl groups, such as those described in German Offenlegungsschrift No. 2,359,616. These preferred polyisocyanates are preferably prepared from polyphenyl-polymethylene polyisocyanates which can be obtained by aniline formaldehyde condensation followed by phosgenation ("crude MDI") and from the distillation residues which are obtainable from the above mentioned polyisocyanates by removal of the dinuclear products by distillation and which generally have a viscosity of between 50 and 50000 P/25° C., an isocyanate content of 28–33% by weight and a functionality higher than 2.

Partially masked polyisocyanates may also be used. Examples include reaction products of the above mentioned polyisocyanates with, for example, phenol, caprolactam, diphenylamine or tertiary butanol. These masked polyisocyanates are particularly suitable in cases where tempering of the end products is intended.

The other starting components used according to the invention are aqueous basic solutions having an inorganic solid content of from 20 to 80% by weight, and preferably 30 to 70% by weight. Suitable aqueous basic solutions of the type include aqueous alkali metal silicate solutions, alkaline stabilized silica sols and/or aqueous suspensions of finely divided fillers. In many cases, combinations of the above mentioned aqueous basic solutions are also used. By basic solutions of alkali metal silicates are meant the solutions of sodium and/or potassium silicate in water which are generally known as waterglass. Crude commercial solutions which, in addition, contain substances such as calcium silicate, magnesium silicate, borates and aluminates may also be used. The molar ratio of $Me_2O/SiO_2$ (Me = alkali metal, e.g., Na, K) is not critical and may vary within the usual limits but is preferably from 2 to 0.1 particularly 0.8 to 0.2. If the water content of the product obtained from the reaction with the polyisocyanate is of minor importance, either because it does not interfere with the use of the product or because it can easily be removed by drying, then one may quite well use a sodium silicate which is only slightly alkaline, which can be prepared, e.g., as 20 to 35% by weight solutions. It is preferable, however, to use 32 to 54% by weight silicate solutions.

Ammonium silicate solutions may also be used, e.g., solutions of guanidinium silicate, but they are less advantageous. The solutions used may be true solutions or colloidal solutions.

The choice of concentration depends mainly on the desired end product. Solid materials or materials with closed cells are preferably produced with concentrated silicate solutions which may require the addition of an alkali metal hydroxide to adjust them to a low viscosity. 40 to 70% by weight solutions can be prepared in this way. On the other hand, for producing open-celled lightweight foams it is preferred to use 30 to 50% by weight silicate solutions in order to obtain low viscosities, sufficiently long reaction times and low densities. Silicate solutions having a concentration of 30 to 50% are also preferred when using larger quantities of finely divided inorganic fillers.

More detailed information about alkali metal silicate solutions suitable for the invention may be found in "Soluble silicates, their properties and uses" by James G. Vail, Reinhold Publishing Corporation, New York 1952.

By silica sols are meant aqueous, colloidal silicic acid solutions which vary in appearance from blue and opalescent to milky white according to their composition. They contain uncrosslinked, spherical particles of very pure amorphous silicic acid. The silicic acid particles which are hydroxylated on the surface generally have no internal porosity. The size of the particles is in the submicroscopic, colloidal region and may vary from 7 to 200 nm but is preferably between 10 and 50 nm.

In individual cases the diameter of the particles may be as small as 2 nm but agglomerates having a particle diameter greater than 200μ may also be produced. The silicic acid content is generally between 20 and 60% by weight and preferably between 25 and 40% by weight.

Commercial silica sols generally contain a trace of sodium or other alkali metal ions to stabilize the colloid system. The pH is normally between 8 and 12. Colloidal silicic acids are prepared either by peptization of a silicic acid hydrogel or by gradual destabilization of alkali metal silicates. For further information, see Kirk-Othmer, Encyclopedia of Chemical Technology, Volume 18 (1969), pages 61 to 72; R. K. Iler, The Colloid Chemistry of Silica and Silicates, Cornell University Press, New York 1955; and J. G. Vail, Soluble Silicates, Vol. I and II, Reinhold, New York, 1952.

The finely divided inorganic fillers used for preparing the aqueous suspensions may, in principle, by any inorganic materials which are insoluble or only sparingly soluble in water and in which at least 50% by weight of the particles are below 50 micron (preferably 50% by weight below 10 micron). Inert mineral fillers or hydraulic mineral binders are preferably used. The following are examples: Calcium hydroxide; magnesium hydroxide; iron hydroxide; aluminum hydroxide; calcium carbonate; magnesium carbonate; chalk; dolomite; calcium oxide; magnesium oxide; calcium sulphate; gypsum; anhydrite; quartz sand; stone meal; ground shale; talcum; satin white; bauxite; kaolin; barium sulphate; barium carbonate; clay; asbestos; silicates; silicon dioxide; powdered glass; alkaline earth metal silicates; zeolites; silicate minerals; coal dust; slag; red mud; brick dust; hydraulic cements, such as Portland cement; quick setting cement; blast furnace cement; low calcined cement; sulphate resistant cement; brick cement; natural cement; lime cement; plaster cement; Pozzuolana cement; calcium sulphate cement. Naturally occurring loam may also be used.

Aqueous suspensions of fillers having a solid content of between 20 and 80% by weight can be used according to the invention. If the dry fillers already fulfill the criteria according to the invention with regard to their particle size (at least 50% by weight smaller than 50 micron) they may be mixed with water to form a suspension without further preparation. If the particles are coarser, an aqueous coarse suspension of the fillers may be converted into a fine suspension suitable for the purpose of the invention by the known method of wet milling.

Particularly preferred aqueous suspensions are those which are resistant to sedimentation and have an easy viscous flow, for example of the kind known in paper spread coating compositions. It is therefore advantageous to prepare such filler suspensions by the known methods used for such spread coating compositions. The preferred stabilized suspensions according to the invention are those which undergo no significant sedimentation over a period of 2 days and have an easy viscous flow. For the purpose of the present invention, aqueous filler suspensions are regarded as stabilized if the dispersed fillers are dispersed as individual particles substantially free from agglomerates by one or more of the following methods:

1. Use of extremely finely divided fillers consisting of particles smaller than 20 micron, with at least 50% by weight of the particles smaller than 2 micron. Fillers in which 80% consists of particles between 0.5 and 2 micron, as in the case of numerous calcium carbonates, for example, are particularly suitable.

2. Use of surface modified fillers in which the modification has rendered them hydrophilic and therefore more easily dispersible.

3. Preparation of the dispersion with the aid of shearing forces which destroy agglomerates, as for example is customary for preparing pigment pastes and pigmented lacquer systems, e.g. by abrasion on a three roll mill, a sand mill or the like.

4. Addition of dispersing agents and dispersion stabilizers e.g. salts of phosphoric acid; pyrophosphoric acid; metaphosphoric acid; polyphosphoric acids; phosphorous acids; oligosilicic acids; polysilicic acids or organic high molecular weight polyacids such as poly(meth)acrylic acids; copolymers of poly(meth)acrylic acids; polymaleic acids; copolymers of polymaleic acids; water-soluble derivatives of casein; cellulose; starch or alginic acids and plant gums. The usual surface active compounds such as emulsifiers, wetting agents and surface active agents may be used.

5. Use of thickeners such as cellulose derivatives; polyacrylamine; alginates; plant gums or water-soluble polymers, e.g., polyethylene oxide, inorganic thickeners such as bentonites.

6. Use of high molecular weight and low molecular weight diols or polyalcohols or diamines or polyamines.

Particularly preferred are suspensions which have been prepared with the addition of from 0.05 to 20% by weight, based on the filler, of one or more of the additives mentioned under 4, 5 and 6. Although less economical, it is also advantageous to use surface modified and therefore hydrophilic fillers, thereby generally obviating the need for additives.

If the filler suspension is stabilized by organic additives, these should not be used in quantities of more than 5%, based on the filler, so that they will not deleteriously affect the fire characteristics of the inorganic-organic materials.

Suspensions with excellent resistance to sedimentation and flow properties suitably adjusted to the working up process are obtained, particularly if the suspensions contain additives mentioned under 4 and/or 5 and/or 6 and, in addition, are prepared according to the criteria mentioned under 1 and 3.

When filler suspensions which have been stabilized by additives are used, it is preferred to use fillers in which at least 90% by weight of the particles measure less than 20 micron and at least 50% by weight measure less than 10 micron.

The filler suspension may, of course, be prepared immediately before it is mixed with the polyisocyanate. For example, dry fillers and water may be fed into one feed pipe leading to the mixing chamber in which the polyisocyanate is mixed with the filler suspension, and the dry fillers and water may then be mixed by a mixing device, e.g., a screw, situated inside this feed pipe to produce the aqueous filler suspension in situ.

When hydraulic binders are used, particularly cement, the suspensions are generally prepared immediately before they are mixed with the isocyanate component because the setting process preferably takes place within the finished product. It is generally preferable to add stabilizing agents mentioned under 4 to 6 for preparing the suspensions because they have an advantageous effect on the processing properties.

The filler suspensions used preferably have a viscosity above 100 cP to ensure suitable flow properties for processing. On the other hand, they should have an easy flow and, on no account, should they have a crumbly consistency. Their viscosity preferably does not exceed 10,000 cP. Thorough and very intimate mixing with the polyisocyanate in the usual processing apparatus should be ensured. On the other hand, the filler content of the aqueous suspension should be as high as possible so as not to introduce more water into the finished product than is absolutely necessary. Depending on the particle size and structure of the filler particles, the filler concentration should be between 30 and 80% and is preferably between 50 and 70%. It is generally necessary to use low concentrations if non-spherical fillers such as asbestos, talcum or clays are used.

The pH of the aqueous filler suspension should be at least 8 and preferably at least 9. If basic fillers are used at least partly, the pH of the suspension will generally be at least 8, but if not, the pH must be adjusted to at least 8 by the addition of basic substances. This can be done, for example, by adding alkalies such as potassium hydroxide solution, sodium hydroxide solution or basic salts. The three main groups of aqueous alkaline solutions mentioned above may, of course, also be used as combinations, and the addition of alkali metal silicate solutions both when silica sols are used and when filler suspensions are used has a particularly advantageous effect when producing inorganic organic foams.

For preparing the inorganic resins, organic ammonium compounds, preferably of the general formula

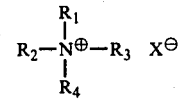

are used as catalysts according to the invention.

In the above formula, $R_1$, $R_2$ and $R_3$ represent alkyl, aryl or cycloalkyl, $R_1 + R_2$ may together represent alkylene, arylene, cyclo alkylene and $R_4$ represents H, $R_1$, $R_2$, $R_3$ and $X^\ominus$ represents an anion, preferably $RCOO^\ominus$; $H_2PO_4^\ominus$; $H_2PO_3^\ominus$; $ROSO_3^\ominus$; $RSO_3^\ominus$; $ArO^\ominus$; $(RO)_2PO_2^\ominus$; $(RO)_2PO^\ominus$; $H(RO)PO_3^\ominus$; $F^\ominus$; $Cl^\ominus$; $Br^\ominus$; $I^\ominus$; $HSO_4^\ominus$; $HSO_3^\ominus$; $NO_3^\ominus$; $CN^\ominus$; $SCN^\ominus$; $HCO_3^\ominus$; in which $R = R_4$. The groups $R_1$, $R_2$, $R_3$ may be the same or different.

Preparation of the catalysts according to the invention is carried out in the simplest case by reacting a tertiary amine with an acid or an alkylating agent or by reacting a secondary amine with an alkylating agent. Although in principle any tertiary amines may be used, those which are known to accelerate the reaction of polyisocyanates with reactive hydrogen atoms are preferred, e.g., tertiary amines such as triethylamine; tributylamine; N-methylmorpholine; N-ethyl morpholine; N-cocomorpholine; N,N,N',N'-tetramethylethylene diamine; 1,4-diaza-bicyclo-(2,2,2)-octane; N-methyl-N'-dimethyl-aminoethylpiperazine; N,N-dimethylbenzylamine; bis(N,N-diethyl-aminoethyl)-adipate; N,N-diethylbenzylamine; pentamethyldiethylene triamine; N,N-dimethyl-cyclohexylamine; N,N,N',N'-tetramethyl-1,3-butane diamine; N,N-dimethyl-β-phenylamine; 1,2-dimethylimidazole; 2-methylimidazole; N,N-dimethyl-β-methoxy-ethylamine; 2-piperidenoethylmethyl-ether, tris-(dimethylaminopropyl)-hexahydrotriazine, 2,4,6-tris-(dimethylaminomethyl)-phenol; o-dimethylaminomethylphenol; p-dimethylaminomethylphenol; tetramethyl-1,3-butanediamine; tetramethylpropanediamine; (N-methylmorpholine) and 2,2'-bis-(dimethylamino)-diethylether.

Tertiary amines containing hydrogen atoms which are reactive with isocyanate groups are also suitable, e.g., triethanolamine; triisopropanolamine; N-methyldiethanolamine; N-ethyldiethanolamine; N,N-diethylethanolamine; β-piperidinoethanol and their reaction products with alkylene oxides such as propylene oxide and/or ethylene oxide. The last mentioned group of amines is less suitable for preparing the catalysts according to the invention if the catalysts are used as solutions in polyisocyanates because the reaction with isocyanate causes unwanted increases in viscosity or may also result in a reduction in functionality due to semiprepolymer formation.

The acid components required for preparing the catalysts may be any organic or inorganic acids.

If the catalyst is to be dissolved and/or prepared in the polyisocyanate, the acid component used is generally an anhydrous acid which is soluble in polyisocyanate. Suitable acids for this purpose include, for example, aliphatic and aromatic carboxylic acids such as formic acid, acetic acid, propionic acid, butyric acid, benzoic acid, phenylacetic acid, succinic acid, adipic acid, phthalic acid, maleic acid; fumaric acid and oleic acid. Amine salts of anhydrous phosphoric acid and polyphosphoric acid are preferred because they often dissolve easily in polyisocyanates, particularly in polyphenylmethylene polyisocyanates, and in addition increase the flame resistance.

The amine salts of sulphuric acid and of unesterified or partially esterified phosphoric or phosphorous acid may also be used according to the invention. Phenols may also be regarded as acids for the purpose of the invention, particularly those with $P_K$ values above 9.5, because by virtue of their acid character they are capable of forming salts with tertiary amines.

The most preferred acid components for synthesis of the salts, however, are organic sulphonic acids, a large number of which are readily available commercially. In addition to their advantage of acting as strong acids so that they form stable amine salts, they have the desirable property of being generally soluble both in organic media and in water and of forming soluble salts. The following are mentioned as examples of members of this type of compound: Aliphatic sulphonic acids such as methane sulphonic acid; ethane sulphonic acid; n-propane sulphonic acid; 2-propane sulphonic acid; n-butane sulphonic acid; n-pentane sulphonic acid; n-hexane sulphonic acid; nonane sulphone acid; decane sulphonic acid; undecane sulphonic acid; dodecane sulphonic acid; tridecane sulphonic acid and tetradecane sulphonic acid as well as aromatic sulphonic acids, which are particularly preferred because of their ready solubility in aromatic polyisocyanates. Examples of these aromatic sulphonic acids include benzene sulphonic acids; p-toluenesulphonic acid; o-toluenesulphonic acid; dodecylbenzene sulphonic acid; p-xylene-2-sulphonic acid; 1,2,4-trimethylbenzene-5-sulphonic acid; p-chlorobenzenesulphonic acid; p-bromobenzene sulphonic acid; 2-nitrotoluene-4-sulphonic acid; 1-nitro-4-chlorobenzene-3-sulphonic acid; sulphanilic acid; aniline-2,5-disulphonic acid; 3-sulphobenzoic acid; benzoic acid-3,5-disulphonic acid; 2-naphthol-7-sulphonic acid, 1,5-naphthalene-disulphonic acid; 1-naphthol-2,4-disulphonic acid; 2-naphthol-6-sulphonic acid and phenol-4-sulphonic acid.

Particularly suitable also are sulphonic acids which contain other acid groups in addition to the sulphonic acid group. These acids include, for example, sulphonic acids containing carboxylic acid groups, which can easily be obtained by sulphonation of the corresponding carboxylic acids. Examples of such compounds include the sulphonation products of oleic acid, azelaic acid, suberic acid, sebacic acid and monomeric fatty acids.

One reason why carboxylic acid and sulphonic acid groups are preferred is that there is no harm in dissolving them in the polyisocyanate in a molar excess over the quantity required for salt formation with the tertiary amine.

If the amine salts used as catalysts are to be used in aqueous solution as a third component in addition to the polyisocyanate and the aqueous alkali metal silicate solution, aqueous acids may be used for the formation of the salts from the tertiary amines, for example mineral acids such as hydrofluoric acid, hydrochloric acid, hydrobromic acid, hydroiodic acid, sulphuric acid, sulphurous acid, nitric acid, phosphoric acid or phosphorous acid, or also hydrocyanic acid, thiocyanic acid or carbonic acid.

Suitable catalysts according to the invention also include organic ammonium compounds obtained by reaction of secondary or tertiary amines with alkylating agents. Suitable alkylating agents include, for example, allyl halides, benzyl halides, α-halogen ketones, alkyl sulphates, alkyl-p-toluenesulphonates, alkyl halides, sultones and β-lactones. The following are mentioned as examples: Methyl chloride, methyl bromide, methyl iodide, ethyl bromide, propyl bromide, butyl bromide, dimethylsulphate, diethylsulphate, methyl chloromethyl ether, methyl-1,2-dichloroethyl ether, ethylchloromethyl ether, benzyl chloride, benzyl bromide, p-chlorobenzyl chloride, trichlorobenzyl chloride, p-nitrobenzyl chloride, ethylene chlorohydrin, ethylene bromohydrin, epichlorohydrin, ethylene oxide, propylene oxide, styrene oxide, benzene, toluene and naphthalene sulphonic acid esters, ω-bromoacetophenone, dinitrochlorobenzene, δ-chloropentenamide, chloroacetic acid and its esters and amide, chloromethyl dimethyl ethoxy silane, pentamethyl chloromethyl disiloxane, pentamethyl chloromethyl disiloxane, pentamethylbromomethyl disiloxane, glycol monobromoacetic acid ester, glycero monochloroacetic acid ester, bromoethyl isocyanate, chloromethyl naphthalene, 3-methyl-3-hydroxymethyl-oxetanemethane sulphonate, phenyl ethyl bromide, p-2-bromoethylbenzoic acid, 5-chloromethyl-furan-2-carboxylic acid, ethylphosphonous acid dichloroisopropyl ester, acetoacetic acid bromoethyl ester, propane sultone and butane sultone. Other examples of suitable materials are described in German Auslegeschrift No. 1,205,087.

Epoxides are used as quaternizing agents in combination with water and/or an acid.

Polyfunctional alkylating agents are also suitable, e.g., 1,4-dibromobutane, 1,4-dichlorobutene; p-xylene dichloride; 1,3-dimethyl-4,6-bis-chloromethylbenzene; methylene-bis-chloroacetamide; hexamethylene-bis-bromoethyl urethane and adducts of 2 to 3 mol of chloroacetamide to a diisocyanate or triisocyanate. Other suitable polyfunctional alkylating agents have been described, for example, in published Dutch patent application No. 67/03743.

The catalysts according to the invention are generally used in a quantity of between about 0.001 and 10% by weight, and preferably between 0.1 and 5% by weight, based on the quantity of polyisocyanate.

The starting materials used according to the invention may also include compounds with a molecular weight generally between 400 and 10,000 and which contain at least two hydrogen atoms capable of reacting with isocyanates. Apart from compounds with amino groups, thiol groups or carboxyl groups, these compounds are preferably polyhydroxyl compounds, and in particular compounds containing from 2 to 8 hydroxyl groups and especially those with molecular weights of from 800 to 10,000, preferably 1000 to 6000. Examples include polyesters, polyethers, polythioethers, polyacetals, polycarbonates or polyester amides containing at least two, generally 2 to 8 and preferably 2 to 4 hydroxyl groups, such as those generally known for the production of both homogeneous and cellular polyurethanes.

Suitable polyesters with hydroxyl groups include, for example, reaction products of polyhydric, preferably dihydric alcohols, to which trihydric alcohols may be added and polybasic, preferably dibasic carboxylic acids. Instead of using free polycarboxylic acids, the polyesters may, of course, also be prepared from the corresponding polycarboxylic acid anhydride or corresponding polycarboxylic acid esters of lower alcohols or mixtures thereof. The polycarboxylic acids may be aliphatic, cyclo-aliphatic, aromatic and/or heterocyclic and they may be substituted, e.g., with halogen atoms, and/or unsaturated. The following are given as examples:

Succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid, maleic acid anhydride, fumaric acid; dimeric and trimeric fatty acids such as oleic acid, optionally in combination with monomeric fatty acids; dimethylterephthalate and terephthalic acid-bis-glycol esters. Suitable polyhydric alcohols include, e.g., ethylene glycol; propylene glycol-(1,2) and -(1,3); butylene glycol-(1,4) and -(2,3); hexanediol-(1,6); octanediol-(1,8); neopentyl glycol; cyclohexane dimethanol (1,4-bis-hydroxymethylcyclohexane); 2-methyl-1,3-propanediol; glycerol; trimethylol propane; hexanetriol-(1,2,6); butanetriol-(1,2,4); trimethyl-olethane, pentaerythritol, quinitol; mannitol and sorbitol; methyl glycoside; diethylene glycol; triethyleneglycol; tetraethylene glycol; polyethylene glycol; dipropylene glycol; polypropylene glycols; dibutylene glycol and polybutylene glycols. The polyesters may also contain carboxyl end groups. Polyesters of lactones, e.g., $\epsilon$-caprolactone, or hydroxycarboxylic acids, e.g., $\omega$-hydroxycaproic acid, may also be used.

The polyethers used according to the invention, which contain at least 2, generally 2 to 8 and preferably 2 to 3 hydroxyl groups, are known per se and may be obtained, for example by polymerization of epoxides such as ethylene oxide, propylene oxide, butylene oxide, tetrahydrofuran, styrene oxide or epichlorohydrin, either on their own, e.g., in the presence of boron trifluoride or by addition of these epoxides, either as mixtures or successively, to starting components which contain reactive hydrogen atoms such as alcohols or amines, e.g., water, ethylene glycol, propylene glycol-(1,3) or -(1,2), trimethylolpropane, 4,4'-dihydroxy-diphenyl propane, aniline, ammonia, ethanolamine or ethylene diamine. Sucrose polyethers may also be used according to the invention, for example those described in German Auslegeschriften Nos. 1,176,358 and 1,064,938. It is frequently preferred to use polyethers which contain predominant amounts of primary hydroxyl groups, (up to 90% by weight, based on all the hydroxyl groups present in the polyether). Polyethers modified with vinyl polymers, for example the compounds obtained by the polymerization of styrene or acrylonitrile in the presence of polyethers as described in U.S. Pat. Nos. 3,383,351; 3,304,273; 3,523,093 and 3,110,695 and German Pat. No. 1,152,536; and polybutadienes which contain hydroxyl groups are also suitable.

Among the polythioethers should be particularly mentioned the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythioether ester amides, depending on the cocomponents.

Suitable polyacetals include, for example, the compounds which can be prepared from glycols such as diethylene glycol, triethylene glycol, 4,4'-dioxethoxydiphenyldimethyl methane, hexanediol and formaldehyde. Suitable polyacetals for the purpose of the invention may also be obtained by polymerizing cyclic acetals.

Suitable polycarbonates with hydroxyl groups are known per se, and include, for example compounds prepared by reacting diols such as propane-1,3-diol, butane-1,4-diol and/or hexane-1,6-diol, diethylene glycol, triethylene glycol or tetraethylene glycol with diarylcarbonates, (e.g., diphenylcarbonate) or phosgene.

Suitable polyester amides and polyamides include, e.g., the predominantly linear condensates obtained from polybasic saturated and unsaturated carboxylic acids or their anhydrides and polyvalent saturated and unsaturated amino alcohols, diamines, polyamines and mixtures thereof.

Polyhydroxyl compounds already containing urethane or urea groups and modified or unmodified natural polyols such as castor oil, carbohydrates or starch may also be used. Additional products of alkylene oxides and phenol formaldehyde resins or of alkylene oxides and urea formaldehyde resins may also be used according to the invention.

Examples of these types of compounds which may be used according to the invention have been described e.g. in High Polymers, Vol. XVI, "Polyurethanes, Chemistry and Technology," by Saunders-Frisch, Interscience Publishers, New York, London, Volume I, 1962, pages 32 to 42 and pages 44 to 54 and Volume II, 1964, pages 5 to 6 and 198 to 199 and in Kunststoff-Handbuch, Volume VII, Vieweg-Hochtlen, Carl-Hanser-Verlag, Munich, 1966, e.g., on pages 45 to 71.

One may, of course, use mixtures of the above mentioned compounds which have a molecular weight of 400, to 10,000 and contain at least two hydrogen atoms reactive with isocyanates, e.g., mixtures of polyethers and polyesters.

The starting materials used according to the invention, may also include compounds with a molecular weight of 32 to 400 which contain at least two hydrogen atoms reactive with isocyanates. These compounds again are compounds containing hydroxyl and/or amino and/or thiol and/or carboxyl groups, preferably hydroxyl and/or amino groups. They are used as chain lengthening agents or cross-linking agents. They generally contain 2 to 8 isocyanate reactive hydrogen atoms, preferably 2 or 3 such hydrogen atoms. The following are examples of these compounds: Ethylene glycol; propylene glycol-(1,2)- and -(1,3); butylene glycol-(1,4) and -(2,3); pentanediol-(1,5); hexanediol-(1,6); octanediol-(1,8); neopentyl glycol; 1,4-bis-hydroxymethylcyclohexane; 2-methylpropanediol-(1,3); glycerol; trimethylolpropane; hexanetriol-(1,2,6); trimethylolethane; pentaerythritol; quinitol; mannitol and sorbitol; diethylene glycol; triethylene glycol; tetraethylene glycol; polyethylene glycols having a molecular weight of up to 400; dipropylene glycol; polypropylene glycols with a molecular weight up to 400; dibutylene glycol; polybutylene glycols with a molecular weight up to 400; 4,4'-dihydroxydiphenylpropane; dihydroxymethylhydroquinone; ethanolamine; diethanolamine; triethanolamine; 3-aminopropanol; ethylene diamine; 1,3-diaminopropane; 1-mercapto-3-aminopropane; 4-hydroxy or -aminophthalic acid; succinic acid; adipic acid; hydrazine; N,N'-dimethylhydrazine and 4,4'-diaminodiphenylmethane. Here again mixtures of various compounds containing at least two isocyanate reactive hydrogen atoms having a molecular weight of 32 to 400 may be used.

According to the invention, readily volatile organic substances may be used as blowing agents. Suitable organic blowing agents include, e.g., acetone; ethyl acetate; halogenated alkanes such as methylene chloride; chloroform; ethylidene chloride; vinylidene chloride; monofluorotrichloromethane; chlorodifluoromethane and dichlorodifluoromethane; butane, hexane, heptane and diethylether. The action of a blowing agent can also be obtained by adding compounds which decompose at temperatures above room temperature with the liberation of gases such as nitrogen, for example azo compounds such as azoisobutyric acid nitrile. The water in the mixture may also function as blowing agent. Fine metal powders such as calcium, magnesium, aluminum or zinc powder may also act as blowing agents by causing the evolution of hydrogen in sufficiently alkaline solutions, and at the same time they may have a hardening and strengthening action.

Other examples of blowing agents and details of the use of blowing agents may be found in Kunststoff Handbuch, Volume VII, published by Vieweg and Höchtlen, Carl-Hanser-Verlag, Munich 1966, e.g., on pages 108 and 109, 453 to 455 and 507 to 510.

Inert gases such as air, nitrogen, oxygen, hydrogen or carbon dioxide may also be used as blowing agents.

Surface active additives such as emulsifiers and foam stabilizers may also be used according to the invention. Suitable emulsifiers include, e.g., the sodium salts of ricinoleic sulphonates or salts of fatty acids.

The foam stabilizers used are mainly polyether siloxanes, especially those which are water-soluble. These compounds generally have a polydimethylsiloxane group attached to a copolymer of ethylene oxide and propylene oxide. Foam stabilizers of this kind have been described, for example, in U.S. Pat. Nos. 2,834,748; 2,917,480 and 3,629,308.

Other additives which may be used according to the invention include reaction retarders, e.g., substances which are acid in reaction such as hydrochloric acid or organic acid halides, cell regulators known per se such as paraffins or fatty alcohols or dimethyl polysiloxanes, pigments, dyes, flame retarding agents known per se such as tris-chloroethylphosphate, tricresyl phosphate or ammonium phosphate and polyphosphate, stabilizers against ageing and weathering, plasticizers, fungistatic and bacteriostatic substances and fillers such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may be used according to the invention and details concerning their use and action may be found in Kunststoff-Handbuch, Volume VII, published by Vieweg and Höchtlen, Carl-Hanser-Verlag, Munich 1966, e.g., on pages 103 to 113.

The process of preparing the inorganic organic materials according to the present invention is simple. All that is required is to mix the liquid polyisocyanate with the aqueous alkaline solution in the prescribed proportions in the presence of the catalysts used according to the invention to produce a homogeneous mixture which in most cases hardens very rapidly.

According to a preferred method, the catalyst is used as a solution in the polyisocyanate. It may either be dissolved or dispersed in the polyisocyanate or prepared in the polyisocyanate. If the catalyst is to be prepared in the polyisocyanate, an acid, preferably an anhydrous acid, or an alkylating agent is generally first dissolved in the polyisocyanate, and an organic ammonium compound is then prepared by the addition of equimolecular or slightly less than equimolecular quantities of tertiary amine. The molar quantity of amine should not exceed the molar quantity of acid or alkylating agent because otherwise the polyisocyanates will not be stable in storage. If, on the other hand, a neutral ammonium compound is dissolved in the polyisocyanate or the ammonium compound is prepared in the polyisocyanate using quantities of alkylating agent or acid which are equimolecular or in excess of the amine, the resulting polyisocyanates containing catalysts are stable in storage, i.e., there is no substantial increase of viscosity within a few days or even a few weeks. The catalyst begins to be active as soon as it is mixed with the aqueous basic solution and accelerates the reaction between polyisocyanate and water.

It is a special advantage of the process according to the invention that the catalyst does not become active until the reactants have been mixed so that no deleterious activity takes place before mixing. Moreover, the acid component of the catalyst in no way interferes with the process according to the invention and may even exert a very desirable hardening effect.

By contrast, organic ammonium compounds of this kind are generally unsuitable for use as catalysts in conventional polyurethane formulations owing to their potential acid character.

The reaction mixtures are typical finely divided emulsions or sols. They are not optically clear but usually opaque or milky white. The inorganic-organic material finally formed appears to be morphologically preformed in them.

According to the invention, the starting materials are reacted together by the known one shot; prepolymer or semiprepolymer process, often using mechanical devices such as those described in U.S. Pat. No. 2,764,565. Details concerning processing apparatus which may also be used according to the invention may found in Kunststoff-Handbuch, Volume VII, published by Vieweg and Höchtlen, Carl-Hanser-Verlag, Munich 1966, e.g., on pages 121 to 205.

The mixture of all the components is not stable. The so-called pot life during which the mixtures are workable depends on the reactivity of the polyisocyanate, the total quantity of silicate hardener liberated, the concentration of silicate solution and the nature and quantity of catalyst used.

The pot life varies from 0.2 seconds to about one hour and is preferably between about 1 second and 20 minutes.

It follows from this that the components are generally mixed immediately before the molding process.

Production of the inorganic organic materials may in principle be carried out by known commercial methods, for example in the same way as cast or foamed polyurethanes are produced.

The components are preferably treated by the usual commercial process employed for producing polyurethane resins, that is to say they are continuously mixed in a mixing chamber with a short dwelling time and then molded and set at the same time. This may be done by pouring the liquid or pasty mixture into molds, for example, or applying it to surfaces or using it for filling recesses, joints, cracks or the like.

In the mixing process, the proportion of polyisocyanate to aqueous basic solution may vary within the limits of 80:20 parts by weight to 10:90 parts by weight. The proportion of polyisocyanate to aqueous basic solution is preferably between 60:40 and 20:80 parts by weight. Under these conditions, inorganic-organic materials with optimum use properties are obtained, in particular products which have a high insulating capacity and high elasticity, heat distortion temperature and flame resistance.

It is clear from the proportions given above that the proportion of polyisocyanate to aqueous alkaline solution within these limits is not critical for the manufacture of the end products. This is particularly advantageous since it obviates the need for exact dosing in methods of continuous production through feed apparatus and mixing chambers. It is therefore possible to use very sturdy feed apparatus such as gear wheel pumps or eccentric screw pumps.

The activity of the reaction mixture can be adjusted by the proportion of isocyanate to aqueous alkaline solution and by the nature and quantity of catalyst used.

The catalyst is preferably used in the form of a solution. Instead of dissolving it in the polyisocyanate, it may be prepared as an aqueous solution and added as third component in addition to the polyisocyanate and aqueous alkaline solution. According to a preferred embodiment, this aqueous solution in addition contains inorganic phosphates such as potassium and/or ammonium phosphates, thereby imparting additional flame resistance to the materials obtained as end products.

Other water-soluble, dispersible inorganic or organic substances such as nitrates, sulphates, chlorides or sulphonic or carboxylic acids may also be added to the aqueous component in order to impart hydrophilic properties to the end products. This is advantageous for foams used in the domestic sector, for example, or where nutrient salts used for plant cultivation are to be incorporated.

The catalysts used according to the invention may either be dissolved in water, or, preferably they may be prepared in the aqueous solution, for example from the amine and acid. The pH of the resulting solution containing activator should then preferably be neutral or acid and should not be strongly alkaline.

Particularly important and therefore preferred are those additives which improve the fire characteristics of the synthetic products obtained. Apart from the conventional flame retarding agents, such additives include in particular halogenated paraffins and inorganic salts of phosphoric acid, pyrophosphoric acid, metaphosphoric acid or polyphosphoric acid.

The process according to the invention for producing foams basically consists of mixing the above described reactants in one or more stages in an intermittently or continuously operating mixing apparatus and leaving the resulting mixture to foam up and set, usually outside the mixing apparatus in molds or on suitable substrates. The reaction temperature of between about 0° C. and 200° C., preferably between 30° C. and 160° C., can be obtained by either preheating one or more of the reactants before the mixing process or heating the mixing apparatus itself or heating the reaction mixture after the mixing process. One may, of course, also employ combinations of these or other methods for adjusting the reaction temperature. In most cases, sufficient heat is generated during the reaction to enable the reaction temperature to rise to levels above 30° C. after onset of the reaction or the foaming process.

Particularly high quality materials are obtained by the process according to the invention if hardening is carried out at temperatures above 20° C. and in particular at 30° to 100° C. So much heat is generated even without external heat supply, especially if combinations of polyisocyanates containing 10 to 40% isocyanate groups and aqueous basic solutions are used, that the water contained in the reaction mixture begins to evaporate. Temperatures of more than 100° C. may be reached in the interior of the foam blocks.

It appears that under these conditions particularly vigorous interactions take place and an exceptionally intimate bond is formed between the inorganic and organic polymer so that the materials obtained are both hard and lighly elastic and therefore exceptionally shock resistant and resistant to breakage.

If the heat of the reaction between the components is not sufficient, the mixing process may quite well be carried out at higher temperatures, e.g., between 40° C. and 100° C., and in some cases the reactants may be mixed at temperatures above 100° C. and up to about 150° C. under pressure so that as the material leaves the apparatus the pressure on it is released and foam formation sets in.

For any given formulation of reaction mixture, the properties of the resulting foams, for example their density in the moist state, depend to some extent on the parameters of the mixing process such as the structure and speed of the stirrer, the structure of the mixing chamber and the selected reaction temperature at the onset of foaming. This density may vary between about 5 and 600 kg/m$^3$ but in most cases the fresh foam has a density of between 20 and 400 kg/m$^3$. When dry, the foams may have an open or closed cell structure but they are in most cases substantially opencelled and have densities of between 8 and 260 kg/m$^3$.

Of exceptional interest are the lightweight inorganic organic foams obtainable by the process according to the invention which have a gross density of 8 to 80 kg/m$^3$.

The starting components used in that case are polyisocyanates and alkali metal silicate solutions which are preferably free from fillers and, in order to obtain good fire characteristics, the inorganic aqueous component is used in excess, based on the weight, and blowing agents such as air, halogenated hydrocarbons or compounds such as hydrogen peroxide which liberate gases are usually added to obtain the desired low gross densities.

Inorganic-organic foams which are particularly interesting for the building industry as lightweight insulating materials because of their excellent fire characteristics and good thermal insulating properties can thus be produced in the presence of catalysts and stabilizers, using the foaming machines which are conventionally used in polyurethane technology, such as piston pumps for high pressure delivery and mixing chambers operating on the counter injection principle or gear wheel pumps for low pressure delivery with mixing apparatus equipped with mechanical stirrers.

The excellent fire characteristics can be even further improved by the addition of flame retarding agents but particularly also by the addition of inorganic aqueous salt solutions or suspensions, e.g., of alkali metal, ammonium or alkaline earth metal phosphates, urea solutions, phosphoric acid, etc., some of the compounds mentioned above, particularly acid phosphates and phosphoric acid, having the additional advantage of being able to serve as hardeners for the alkali metal silicate solution which is usually used in excess.

These foams can be produced as continuous or separate blocks or as laminated or unlaminated boards by the laminater process or they can be produced on the building site either by means of one of the above mentioned mixing apparatus or by a primitive mixing method.

Very high quality lightweight building materials for construction work can be produced by foaming the reaction mixtures suitable for the lightweight foams mentioned above in the presence of fillers in the form of inorganic granulates of low density such as blown glass, expanded clay, expanded shale and pumice. In these products, the fire characteristics are determined mainly by the inorganic properties whereas the simple technology, efficient heat insulation and possibility of applying surface layers by direct foaming in a single manufacturing step are due mainly to the properties of the isocyanate based organic foams. Elements for walls and facades which can be classified as incombustible building materials (A2) according to DIN 4102 owing to the low proportion of organic components in the whole composite material can thus be produced by a relatively simple process.

The products of the process can be used for many other different fields of application, the most important of which have been described in German Offenlegungsschriften Nos. 1,770,384; 2,227,147; 2,325,090; 2,359,607; 2,359,609; 2,359,610 and 2,359,611 and in German Auslegeschrift No. 2,310,559.

EXAMPLES

Polyisocyanates used as starting components:

P1: Diisocyanatodiphenylmethane is distilled off the crude phosgenation products of an aniline formaldehyde condensate until the distillation residue has a viscosity of 50 cP at 25° C. (dinuclear content 68% by weight, trinuclear content 16% by weight, higher nuclear polyisocyanate content 16% by weight, isocyanate content 32% by weight).

P2: Polyisocyanate prepared in the same way as P1 to have a viscosity of 100 cP at 25° C. (dinuclear content 59.7% by weight, trinuclear content 21.3% by weight, higher nuclear polyisocyanate content: 19.0% by weight, isocyanate content 31.4% by weight).

P3: Polyisocyanate prepared in the same way as P1 with a viscosity of 200 cP at 25° C. (dinuclear content 44.3% by weight, trinuclear content 23.5% by weight, higher nuclear polyisocyanate content 32.3% by weight, isocyanate content 31.4% by weight.

P4: Polyisocyanate prepared in the same way as P1 to have a viscosity of 400 cP at 25° C. (dinuclear content 45.1% by weight, trinuclear content 22.3% by weight, higher nuclear polyisocyanate content 32.6% by weight, isocyanate content 31.0% by weight).

P5: Polyisocyanate prepared in the same way as P1 to have a viscosity of 1700 cP at 25° C. (dinuclear content 40.3% by weight, trinuclear content 34.0% by weight, higher nuclear polyisocyanate content 25.7% by weight, isocyanate content 30.4% by weight).

P6: 10 kg of polyisocyanate P4 are introduced into a stirrer apparatus under nitrogen. 10 g of propylene oxide are added dropwise at room temperature and the mixture is stirred for one hour. Excess propylene oxide is then removed by passing nitrogen over the reaction mixture at 40° C. 2 kg of a polyethylene oxide monoalcohol started on n-butanol and having an average molecular weight of 1145, 2.4 g of zinc methyl acetonate and 4.8 g of p-toluenesulphonic acid methyl ester are added and the mixture is stirred for 3 hours at 100° C. The catalyst is blocked by the addition of 5 g of benzoyl chloride and the viscosity and isocyanate content are determined after cooling to room temperature.

Viscosity: 700 cP/25° C.

Isocyanate content: 24% by weight.

P7: 37.55 kg of a crude phosgenation product of an aniline/formaldehyde condensate from which dinuclear content was distilled off until the distillation residue had a viscosity of 400 cP at 25° C. (isocyanate content 30.3% by weight, dinuclear content 45.1% by weight, trinuclear content 22.3% by weight, higher nuclear polyisocyanate content 32.6% by weight) were gasified for 15 hours with a gas mixture consisting of 1160 g of sulphur trioxide and 1.6 m³ of nitrogen at 50° C.

The $SO_3H$ group content calculated theoretically from the sulphur content of 0.99% is 2.5%. The product has a viscosity of 4163 cP at 25° C. Potentiographic titration carried out after completion of the reaction of the isocyanate groups with methanol indicated a total consumption of normal sodium hydroxide of 39.7 ml/100 g of polyisocyanate P7.

The isocyanate content of the product corrected to allow for the acid groups was 29.1% by weight.

Basic aqueous solutions used:

L1: Soda waterglass (44% solid content, molecular weight ratio of $Na_2O/SiO_2 = 1:2$) (Henkel), pH: 12.5.

L2: Silica sol

| Bayer silica sol | 200 |
| --- | --- |
| $SiO_2$ content [a] | approx. 30% |
| $Na_2O$ content [b] | approx. 0.15% |
| pH | approx. 9.0 |
| density | 1.20 g/cm³ |
| viscosity [c] | 3 to 4 cp |
| specific surface [d] | 140 to 180 m²/g |
| particle size | 15–20 mµ |
| ionogenicity | anionic |
| colour | transparent |
| odor | none |

(a) determined by drying the sol at 110° C.

(b) determined by titration (c) determined by means of the Haake falling ball viscosimeter (d) BET value determined by the method of Brunauer, Emmett and Teller.

(e) solid content composed of silicic acid and basic aluminium chloride.

L3: 400 g of chalk (Sokal P2, particle size: 80% 2 μ, Deutsche Solvay AG) were stirred into a solution of 3.2 g of a high molecular sodium salt of a polycarbonate acid (trade name "Polysalz CA" from BASF) in 400 g of water. The resulting suspension was adjusted to pH 12.8 with 5 g of potassium hydroxide and found to have a solid content of 50% by weight.

Additives used:

Z1: Chlorinated paraffin (Witaclor 63, Dynamit Nobel) chlorine content: 62–64% by weight viscosity at 20° C. approximately 40,000 cP Z2: Diphenyl cresyl phosphate Z3: Stabilizer (polyether polysiloxane L 5340 of Union Carbide Corp.)

Z4: Portland cement PZ 350 F (according to DIN 1164)

Z5: Emulsifier, 50% aqueous solution of the sodium salt of a sulphochlorinated paraffin mixture $C_{10}$–$C_{14}$ (Mersolat K 30)

The following abbreviations are used in the description of the preparation of inorganic organic foams:

$t_R$ = stirring time, mixing time of the mixture of component I and component II and optionally component III.

$t_L$ = resting time, time from onset of mixing to onset of foaming.

$t_A$ = gel time, time from onset of mixing to onset of solidification.

$t_S$ = rise time, time from onset of mixing to termination of foaming process.

Density and compression resistance were in each case determined one day after production of the foam.

EXAMPLE 1

18 Parts by weight of dodecylbenzene sulphonic acid were dissolved in 500 parts by weight of polyisocyanate P6 at room temperature. 5 Parts by weight of triethylamine were then introduced dropwise with stirring, and a temperature rise of 4° C. was observed.

The resulting homogeneous, liquid polyisocyanate K1 which contained catalyst was found to have a viscosity of 760 cP/25° C. immediately after its preparation and was used for the production of a lightweight inorganic-organic foam:

| | | |
|---|---|---|
| 100 | Parts by weight of catalyst-containing polyisocyanate K1 | Component I |
| 1.5 | parts by weight of additive Z 3 | |
| 5 | parts by weight of additive Z 2 | |
| 40 | parts by weight of trichlorofluoromethane | |
| 200 | parts by weight of basic, aqueous solution L1 | Component II |

Component I was first thoroughly mixed on its own and then vigorously stirred together with component II, using a high speed stirrer, and the mixture was poured out into a paper bag where it foamed up and finally set to a finely cellular, uniformly tough inorganic-organic foam.

$t_R$ = 15 sec.
$t_L$ = 30 sec.
$t_A$ = 70 sec.
$t_S$ = 100 sec.
Unit weight (kg/m$^3$): 23
Compression resistance (kp/cm$^2$): 0.25

To test the stability in storage of the catalyst-containing polyisocyanate K1, a sample was kept at room temperature and tested weekly over a period of 6 months to determine its viscosity and reactivity (reaction times for preparing the inorganic-organic foam described in Example 1).

No significant increases in viscosity (fluctuations less than 100 cP) and no substantial deviations in the reaction times ($t_L$ ~ 3–4 sec., $t_A$ ~ 5–10 sec., $t_S$ ~ 5–10 sec.) could be detected. The densities (deviations of 3–5 kg/m$^3$) and compression resistances (±0.05 kp/cm$^2$) also remained relatively constant.

Since all the parameters measured remained unchanged over a period of 6 months within the limits of error corresponding to the normal deviations when repeating the experiments, the catalyst-containing polyisocyanate K1 is demonstrably stable in storage, at least over the given period of time.

The two control tests described below clearly show that the ammonium salt catalyst according to the invention which is stable when stored in the polyisocyanate is superior to the amines conventionally used such as triethylamine:

1. If a quantity of triethylamine corresponding to the quantity (1 g) in the catalyst-containing polyisocyanate is stirred into polyisocyanate P6 (100 g) and the increase in viscosity observed, it is found that the polyisocyanate becomes progressively more viscous, has 2 to 3 times the viscosity after only one day and has become solid after about one week and can then no longer be processed.

2. If a quantity of triethylamine (1g) corresponding to the quantity in catalyst-containing polyisocyanate is stirred into waterglass (200 g), phase separation begins immediately the stirrer is switched off and is completed after a few hours. Triethylamine then floats on the aqueous surface in the form of oily patches.

To extend the experiment, all the additives and auxiliary agents used in component I of the reaction mixture for the foam were dissolved in catalyst-containing polyisocyanates. The resulting polyisocyanate mixtures were stable in storage and had the advantage of containing all the auxiliary agents including blowing agents and catalyst in component I in a form which was stable in storage. In this way, high quality inorganic-organic foams similar in their properties to the foam described in this example can be produced as desired from only two components.

EXAMPLE 2

5.15 parts by weight of 105% phosphoric acid were dissolved in 500 parts by weight of polyisocyanate P6 and 5 parts by weight of triethylamine were then added dropwise with stirring. The temperature on the polyisocyanate rose by 2° C. The resulting homogeneous, liquid, catalyst-containing polyisocyanate K2 was used for producing a lightweight inorganic organic foam:

| | | |
|---|---|---|
| 100 | Parts by weight of catalyst-containing polyisocyanate K2 | Component I |
| 1.5 | parts by weight of additive Z3 | |
| 5 | parts by weight of additive Z2 | |

-continued 40 parts by weight of trichlorofluoromethane 200 parts by weight of basic aqueous solution L1 } Component II A tough, light inorganic organic low density foam having a fine, regular cell structure was produced from these components in accordance with Example 1.

| Reaction times (sec.) | Physical data: |
|---|---|
| $t_R = 15$ | Density (kg/m$^3$): 25 |
| $t_L = 38$ | Compression resistance (kp/cm$^2$): 0.28 |
| $t_A = 75$ | |
| $t_S = 110$ | |

The viscosity of the catalysed polyisocyanate K2 was still unchanged after 4 days. An inorganic organic lightweight foam was again produced from the given formulation.

| Reaction times (sec.): | Physical data: |
|---|---|
| $t_R = 15$ | Density (kg/m$^3$): 26 |
| $t_L = 38$ | Compression resistance (kg/cm$^2$) 0.30 |
| $t_A = 75$ | |
| $t_S = 120$ | |

The reaction times and physical data were practically identical.

If, on the other hand, a polyisocyanate containing a corresponding quantity of triethylamine was used instead of the catalyst-containing polyisocyanate, it could be foamed immediately after addition of the activator but the viscosity increased by a factor of 3 after only 24 hours storage at room temperature and the polyisocyanate was solid after 4 days and no longer capable of being foamed.

EXAMPLE 3

3.6 parts by weight of dodecylbenzene sulphonic acid, 1 part by weight of N,N-dimethylbenzylamine, 1.5 part by weight of additive Z3, 5 parts by weight of Z2 and 40 parts by weight of trichlorofluoromethane were stirred successively into 100 parts by weight of polyisocyanate P6.

200 Parts by weight of basic aqueous solution L1 were added to this mixture and mixed with the aid of a high speed stirrer. The reaction mixture was poured out into a paper packet, in which it foamed up and then set to a light, tough, finely cellular inorganic-organic foam.

| Reaction times (sec.): | Physical data: |
|---|---|
| $t_R = 15$ | Density (kg/m$^3$): 32 |
| $t_L = 35$ | Compression resistance (kp/cm$^2$): 0.29 |
| $t_A = 130$ | |
| $t_S = 220$ | |

EXAMPLE 4

An aqueous catalyst solution was prepared by adding dropwise, one after another, 1 part by weight of N,N-dimethylbenzylamine, 0.2 parts by weight of pentamethyl diethylene triamine and 1.6 parts by weight of 105% phosphoric acid to 65 parts by weight of water at room temperature with stirring. 35 parts by weight of dipotassium hydrogen phosphate were dissolved in the clear, aqueous solution obtained. The resulting catalyst-containing clear aqueous solution (K3) was still unchanged after 6 months' storage.

Using catalyst solution K3, inorganic-organic foams were produced from the following formulation:

100 parts by weight of polyisocyanate P6
0.3 parts by weight of additive Z3
5 parts by weight of additive Z2
40 parts by weight of trichlorofluoromethane
} Components I 100 parts by weight of basi aqueous solution L1) Component II 100 parts by weight of catalyst solution K3 Component III Component I was first thoroughly mixed on its own. Component II was then added with stirring and 5 seconds later Component III. The whole mixture was then vigorously mixed and poured out into a paper packet.

Foaming and hardening resulted in a lightweight, tough inorganic organic foam which had a regular, fine cell structure.

| Reaction times (sec.): | Physical data: |
|---|---|
| $t_R = 15$ | Density (kg/m$^3$) 38 |
| $t_L = 20$ | Compresson resistance (kp/cm$^2$) 0.47 |
| $t_A = 65$ | |
| $t_S = 110$ | |

A sample of catalyst solution K3 was left to stand for 6 months and 100 g were removed every 14 days and used to produce a foam according to the formulation given above. The foams obtained were identical within the limits of error.

The reaction times and physical data obtained in the last experiment are given below by way of example:

| Reaction times (sec.): | Physical data: |
|---|---|
| $t_R = 15$ | Density (kg/m$^3$): 36 |
| $t_L = 22$ | Compression resistance (kp/cm$^2$): 0.50 |
| $t_A = 64$ | |
| $t_S = 110$ | |

The use of dipotassium hydrogen phosphate has a particularly advantageous effect in the catalyst solution since it not only increases the total inorganic constituent in the whole mixture but also provides additional flame resistance and reduces the calorific value.

EXAMPLES 5-9

The following aqueous catalyst solutions were prepared according to Example 4:

Catalyst Solution K4:
325 parts by weight of water
5.15 parts by weight of 105% phosphoric acid
5 parts by weight of triethylamine
175 parts by weight of dipotassium hydrogen phosphate Catalyst Solution K5:
325 parts by weight of water,
5.15 parts by weight of 105% phosphoric acid
5 parts by weight of an amine mixture consisting of 75 percent by weight of N,N-dimethylaminoethanol and 25% by weight of diazabicyclooctane
175 parts by weight of dipotassium hydrogen phosphate.

Catalyst Solution K6:
325 parts by weight of water
8 parts by weight of 105% phosphoric acid
5 parts by weight of N-methyl-N'-dimethyl-aminoethyl piperazine
175 parts by weight of dipotassium hydrogen phosphate Catalyst Solution K7:
325 parts by weight of water
5.4 parts by weight of 105% phosphoric acid
5 parts by weight of N,N'-dimethylaminoethanol
175 parts by weight of dipotassium hydrogen phosphate Catalyst Solution K8:
325 parts by weight of water
3.8 parts by weight of 105% phosphoric acid
5 parts by weight of dimethylcyclohexylamine
175 parts by weight of dipotassium hydrogen phosphate Catalyst solutions K4 to K8 are stable in storage for at least 6 months at room temperature.

Samples were removed every 2 weeks over a period of 6 months to produce foams from the foam formulation given in Example 4. No significant changes could be observed either in the reaction times or in the physical properties of the foams obtained.

The results, including the maximum deviations in the foams, each of which were produced 12 times, are summarized in the table below:

| Ex. No. | Catalyst Solution | $t_R$ (sec) | $t_L$ (sec) | $t_A$ (sec) | $t_S$ (sec) | Density (kg/m$^3$) | Compression resistance (kp/cm$^2$) |
|---|---|---|---|---|---|---|---|
| 5 | K4 | 15 | 24±2 | 36±2 | 48±3 | 65±10 | 0.6±0.1 |
| 6 | K5 | 15 | 21±2 | 42±3 | 65±5 | 35±3 | 0.4±0.2 |
| 7[1] | K6 | 15 | 19±2 | 25±5 | 39±5 | 95±15 | 0.2±0.1 |
| 8 | K7 | 15 | 22±2 | 43±3 | 65±5 | 36±3 | 0.4±0.1 |
| 9[1] | K8 | 15 | 19±1 | 27±3 | 33±3 | 77±15 | 0.6±0.2 |

[1] The foams were sandy due to partial decomposition of the bottom of the packet, which had become moist.

With the exception of Examples 7 and 9, tough, inorganic organic foams having a fine, regular cell structure and excellent fire characteristics were obtained. For example, the foams easily pass the Egner fire shaft test and can therefore be classified as flame resistant materials of class B1 according to DIN 4102.

Examples 10-14 represent a repetition of Examples 5-9 except that 50% by weight of polyisocyanate P6 was replaced by polyisocyanate P4. The results are summarized in the following table.

| Example No. | Catalyst Solution | $t_R$ (sec) | $t_L$ (sec) | $t_A$ (sec) | $t_S$ (sec) | Density (kg/m$^3$) | Compression resistance |
|---|---|---|---|---|---|---|---|
| 10 | K4 | 15 | 35 | 100 | 140 | 37 | 0.61 |
| 11 | K5 | 15 | 30 | 110 | 165 | 38 | 0.37 |
| 12 | K6 | 15 | 20 | 70 | 90 | 35 | 0.55 |
| 13 | K7 | 15 | 35 | 120 | 165 | 36 | 0.33 |
| 14 | K8 | 15 | 30 | 80 | 105 | 35 | 0.54 |

The foams obtained in the Examples summarized in this table have almost identical bulk densities. However, both the reaction times and the compression resistances clearly show the great influence of the various ammonium salt catalysts both on the foaming times and on the mechanical properties of the inorganic organic foams.

EXAMPLE 15

1.8 parts by weight of dodecylbenzenesulphonic acid and 0.5 parts by weight of triethylamine were stirred successively into 100 parts by weight of polyisocyanate P1. 100 parts by weight of this catalyst-containing polyisocyanate which is stable in storage was first mixed with 300 parts by weight of basic aqueous solution L1 for 15 seconds at room temperature and then with 41 parts by weight of vermiculite. The resulting substance which can be spread coated with a trowel was then introduced into a mold measuring 4 cm × 4 cm × 16 cm where it hardened with heating (60° C. after 2 minutes, 72° C. after 3 minutes) and increased in volume by about 20 volumes percent. The molded product could be removed after only 6 minutes; its temperature was then 74° C.

Density compression resistance and flexural strength were determined on the next day:

| | |
|---|---|
| Density (kg/m$^3$): | 924 |
| Compression resistance (kp/cm$^2$): | 19.2 |
| Flexural strength (kp/cm$^2$): | 12.8 |

The composite material obtained is distinguished in particular by its excellent fire resistance. For example, when a 1 cm thick board of this material is exposed to the flame of a bunsen burner for 30 minutes, the side facing the flame has a ceramic surface at the end of this time while the other side is still unchanged.

EXAMPLE 16

1.8 parts by weight of dodecylbenzene sulphonic acid followed by 0.5 parts by weight of triethylamine were stirred into 100 parts by weight of polyisocyanate P2 at room temperature. 30 parts by weight of soda water glass L1 were then added within 15 seconds, followed by 600 g of building sand (washed Rhein sand, particles 0-3 mm). Mixing these components produced a grouting composition which was introduced into a mold measuring 4 cm × 4 cm × 16 cm. The mixture began to solidify after 90 seconds, reached a temperature of 50° C. after 2 minutes and could be removed from the mold after 150 seconds. 210 seconds after it had been produced, it had a temperature of 60° C.

On the next day, the physical data were determined on this concrete-like, dimensionally stable sample:

| | |
|---|---|
| Density (kg/m$^3$): | 1820 |
| Compression resistance (kp/cm$^2$): | 65.7 |
| Flexural strength (kp/cm$^2$): | 30.7. |

This material is particularly useful for repair work on concrete or similar purposes in the building industry because of its firm adherence to inorganic surfaces and rapid hardening.

EXAMPLE 17

1.8 parts by weight of dodecylbenzene sulphonic acid and 0.5 parts by weight of triethylamine were dissolved in 100 parts by weight of polyisocyanate P3 at room temperature. 300 parts by weight of soda water-glass L1 and 55 g of sawdust were stirred into this solution within 15 seconds, using a high speed stirrer. The grouting composition was introduced into a metal mold (4 cm × 4 cm × 16 cm) where it began to solidify after only 90 seconds and was completely hard after 150 seconds. The molded product reached its maximum temperature of 55° C. after 3 minutes. On the following day, the physical properties were determined on the rock hard inorganic-organic composite material obtained:

| | |
|---|---|
| Density (kg/m$^3$): | 1140 |
| Compression resistance (kp/cm$^2$): | 69.3 |
| Flexural strength (kp/cm$^2$): | 29.2 |

EXAMPLE 18

Catalyst solution K9 was prepared by dissolving 2.0 parts by weight of 105% phosphoric acid and 1.5 parts by weight of triethylamine in 10 parts by weight of water.

Using catalyst solution K9, an inorganic-organic foam was produced from the following formulation:

| | |
|---|---|
| 130 parts by weight of polyisocyanate P7<br>5 parts by weight of additive Z1<br>20 parts by weight of trichlorofluoromethane | Component I |
| 150 parts by weight of soda waterglass L1<br>0.2 parts by weight of additive Z5 | Component II |
| 13.5 parts by weight of catalyst<br>solution K9 | Component III |

Each component was first mixed on its own. Component I was then introduced into a reaction vessel and component II was added at room temperature with vigorous stirring (high speed stirrer), followed 5 seconds later by component III. The resulting foamable mixture was poured out in a paper pack where it foamed up with evolution of water vapor and hardened to a rock hard inorganic-organic foam with average cell size and regular cell structure.

| Reaction times (sec): | Physical data: |
|---|---|
| $t_R = 20$ | Density (kg/m$^3$): 186 |
| $t_L = 45$ | Compression resistance<br>(kp/cm$^2$) 9.3 |
| $t_S = 60$ | |
| $t_d+ = 72$ | |
| $+t_d =$ time from onset of mixing to onset of evolution of water vapor. | |

The resulting foam can be worked like wood and, owing to its high strength, it can be used in the building industry where high load bearing capacity is required in addition to heat insulation.

EXAMPLE 19

An inorganic organic foam was prepared according to Example 18 with the modification that 100 parts by weight of Portland cement PZ 350 F (according to DIN 1164) were in addition introduced into component I.

| Reaction times (sec.): | Physical data: |
|---|---|
| $t_R = 20$ | Density (kg/m$^3$): 264 |
| $t_L = 28$ | Compression strength<br>(kp/cm$^2$) 14.2 |
| $t_S = 37$ | |
| $t_d = 48$ | |

The effect of using cement is on the one hand that the total proportion of inorganic material (based on the solid content) is increased more than 50% by weight and on the other hand that part of the water in the aqueous alkali metal silicate solution is bound by the cement.

The calorific value of the material per kg is thereby reduced and hence the fire risk reduced when the material is used for building purposes.

EXAMPLE 20

A catalyst solution was prepared by mixing 10 parts by weight of water, 4 parts by weight of a mixture of 75% of N,N-dimethylaminoethanol and 25% by weight of diazabicyclooctane and 10 parts by weight of 37% hydrochloric acid (catalyst solution K 10).

This catalyst solution was used for producing an inorganic organic foam from the following formulation:

| | |
|---|---|
| 150 parts by weight of polyisocyanate P5<br>2 parts by weight of additive Z3<br>15 parts by weight of trichlorofluoromethane | Component I |
| 150 parts by weight of basic aqueous<br>solution L3<br>3 parts by weight of glycerol<br>4 parts by weight of potassium hydroxide | Component II |
| 28 parts by weight of cattalyst solution K 10) | Component III |

Each component was first thoroughly mixed on its own and the different components were then mixed together with the aid of a high speed stirrer, Component I being first introduced into the reaction vessel and Component II added, followed by Component III. A tough, lightweight inorganic organic foam having a regular medium pore size is obtained after foaming and hardening. It has slight flaws at the bottom and a brittle surface.

| Reaction times (sec.): | Physical data: |
|---|---|
| $t_R = 20$ | (immediately after production<br>of the foam) |
| $t_L = 25$ | Density (kg/m$^3$) 32 |
| $t_S = 105$ | Compression resistance<br>(kp/cm$^2$) 0.2 |

EXAMPLE 21

Catalyst solution K 11 was prepared by mixing 5 parts by weight of water with 5 parts by weight of 85% phosphoric acid and 2 parts by weight of triethylamine.

An inorganic organic foam was produced from the following formulation:

| | |
|---|---|
| 150 parts by weight of polyisocyanate P7<br>20 parts by weight of trichlorofluoromethane | Component I |
| 100 parts by weight of basic aqueous<br>solution L1<br>50 parts by weight of basic aqueous<br>solution L2<br>0.2 parts by weight of additive Z5 | Component II |
| 12 parts by weight of catalyst solution K 11) | Component III |

Each component is a stable solution on its own. The components are mixed at room temperature with the aid of a high speed stirrer. Component I is first introduced into a reaction vessel, followed by Component II and 5 seconds later Component III. The whole mixture is then vigorously stirred and poured out into a paper packet.

After the foaming process, water vapor is evolved and a rock hard inorganic organic foam with a somewhat coarse but regular cell structure is obtained.

| Reaction times (sec.) | Physical data: |
|---|---|
| $t_R = 20$ | Density (kg/m$^3$) 241 |
| $t_L = 45$ | Compression resistance (kp/cm$^2$) 16.2 |
| $t_S = 70$ | |
| $t_d = 120$ | |

What is claimed is:

1. A process for the production of inorganic-organic resins, by reaction of an organic polyisocyanate with aqueous basic solutions having an inorganic solid content of from 20 to 80% by weight in the presence of at least one catalyst and optionally other additives, wherein the organic polyisocyanate and the aqueous basic solution are used in a proportion by weight of between 80:20 and 10:90 parts by weight and wherein said catalyst is an organic ammonium compound selected from the group consisting of organic secondary amine salts, organic tertiary amine salts, and organic quaternary ammonium salts, said catalysts being used in a quantity of from 0.001 to 10% by weight based on the polyisocyanate.

2. The process of claim 1 wherein said aqueous basic solution has an inorganic solid content of from 30 to 70 percent by weight.

3. The process of claim 1, characterized in that the polyisocyanate and aqueous basic solution are used in a proportion by weight of between 60:40 and 20:80 parts by weight.

4. The process of claim 1, characterized in that the organic ammonium compound used is an amine salt of the general formula

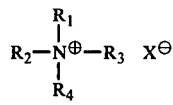

in which
R$_1$, R$_2$, R$_3$ which may be the same or different, represent alkyl, aryl or cycloalkyl groups or
R$_1$ + R$_2$ may together represent an alkylene arylene or cycloalkylene group and R$_4$ represents H, R$_1$, R$_2$, R$_3$ and
X$^\ominus$ represents an anion.

5. The process of claim 4 wherein X$^\ominus$ represents a member selected from the group consisting of RCOO$^\ominus$, H$_2$PO$_4^\ominus$, H$_2$PO$_3^\ominus$, ROS$_3^\ominus$, ROS$_3^\ominus$, (RO)$_2$PO$_2^\ominus$, (RO) PO$^\ominus$, H(RO)PO$_3^\ominus$, F$^\ominus$, Cl$^\ominus$, Br$^\ominus$, I$^\ominus$, NO$_3^\ominus$, HSO$_4^\ominus$, HSO$_3^\ominus$, CN$^\ominus$, SCN$^\ominus$, HCO$_3^\ominus$,
in which R = R$_4$.

6. The process of claim 4, characterized in that the aqueous basic solutions used are aqueous alkali metal silicate solutions having an inorganic solid content of from 20 to 70% by weight.

7. The process of claim 6 wherein said inorganic solid content is from 30 to 50 percent by weight.

8. The process of claim 4, characterized in that the aqueous basic solutions used are alkali stabilized silica sols having an inorganic solid content of from 20 to 60% by weight.

9. The process of claim 8, characterized in that the aqueous basic solutions used are alkali stabilized silica sols having an inorganic solid content of from 25 to 40% by weight.

10. The process of claim 4, characterized in that the aqueous basic solutions used are aqueous suspensions of inorganic fillers having an inorganic solid content of from 30 to 80% by weight.

11. The process of claim 10, characterized in that the aqueous basic solutions used are aqueous suspensions of inorganic fillers having an inorganic solid content of from 50 to 70% by weight.

12. The process of claim 1, characterized in that the catalyst is dissolved in the polyisocyanate.

13. The process of claim 1, characterized in that the catalyst is prepared in the polyisocyanate component by first dissolving the appropriate acid in the polyisocyanate and then adding a tertiary amine.

14. The process of claim 1, characterized in that the catalyst is used in aqueous solution.

15. The process of claim 13, characterized in that the acid component is used in molar excess over the amine in the preparation of the catalyst.

16. The process of claim 1, characterized in that the catalyst is used in quantities of from 0.1–5% by weight, based on the polyisocyanate.

17. The process of claim 1, characterized in that the catalysts used are salts of tertiary amines and organic sulphonic acids.

18. The process of claim 17 wherein said catalysts are selected from the group consisting of salts of triethylamine, tributylamine, N-methylmorpholine, N-ethylmorpholine, N-cocomorpholine, N,N,N',N'-tetramethylethylenediamine, 1,4-diaza-bicyclo-(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-$\beta$-phenylethylamine, 1,2-dimethylimidazole, or 2-methylimidazole and methane sulphonic acid, ethane sulphonic acid, benzene sulphonic acid, p-toluenesulphonic acid, dodecylbenzenesulphonic acid, chloro- and dichlorobenzene sulphonic acid, 5-nitro-1-naphthalene sulphonic acid, or p-methoxybenzene sulphonic acid.

19. The process of claim 18, characterized in that the polyisocyanates used are insoluble in water.

* * * * *